June 10, 1924.  H. R. BOTHWELL  1,496,975
CIRCULAR SAW CLAMP
Filed July 1, 1921
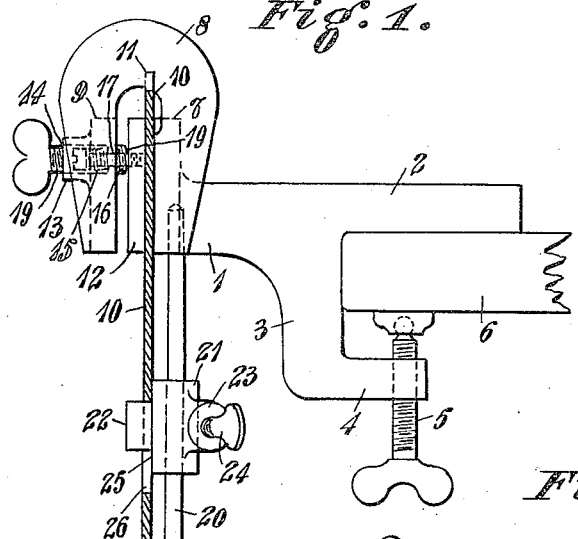
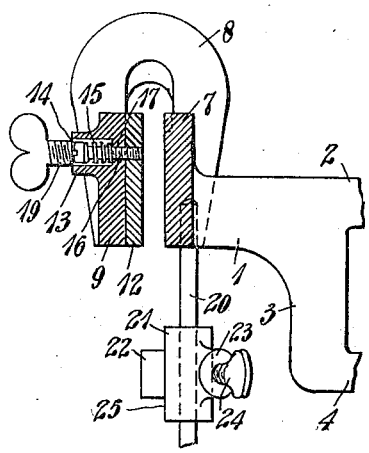
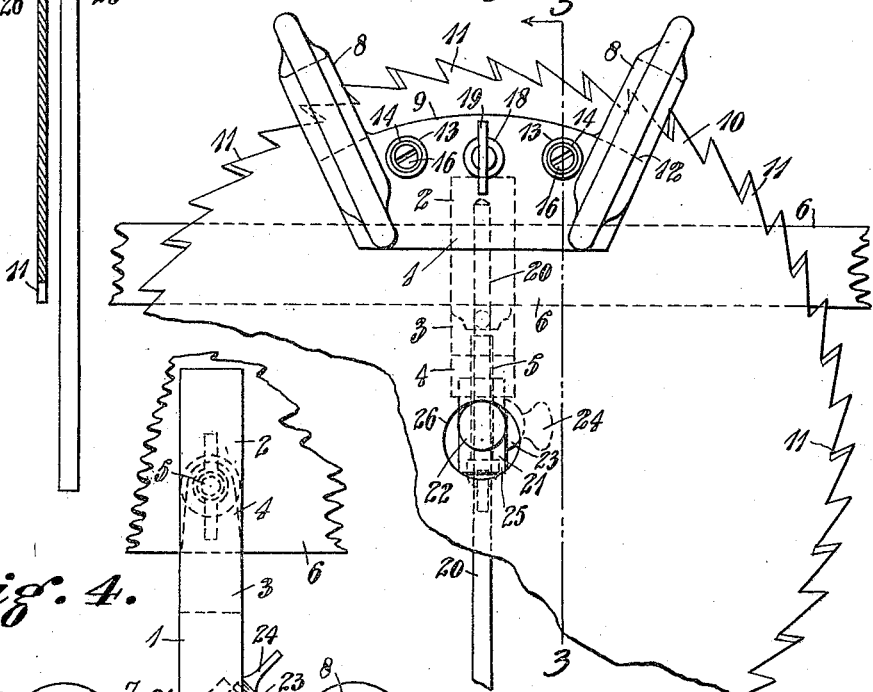
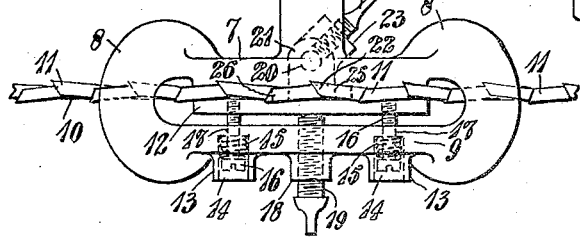
INVENTOR
Henry R. Bothwell
BY Clarence Pordew
ATTORNEY Patented June 10, 1924.

1,496,975

UNITED STATES PATENT OFFICE.

HENRY R. BOTHWELL, OF CINCINNATI, OHIO, ASSIGNOR TO SAMUEL NEWMAN, OF CINCINNATI, OHIO.

CIRCULAR-SAW CLAMP.

Application filed July 1, 1921. Serial No. 481,871.

*To all whom it may concern:*

Be it known that I, HENRY R. BOTHWELL, a Canadian subject of the King of Great Britain, residing at Cincinnati, in the county of Hamilton and State of Ohio, have invented certain new and useful Improvements in Circular-Saw Clamps, of which the following is a specification.

My invention relates to saw-clamps, and its object is to facilitate the sharpening of circular saws, to minimize the vibration and noise consequent to saw-filing of this kind, to have the device conveniently portable, to provide for sharpening saws of different diameters, and to make the device as inexpensive as is consistent with the adequate performance of the duties mentioned. Other objects will appear in the course of the ensuing description.

I attain these objects by the device illustrated, for example, in the accompanying drawing, in which—

Figure 1 is a side elevation of the device, with a saw held therein, the saw being in diametral section;

Fig. 2 is a front elevation of the device with the saw therein as in Fig. 1, parts of the device and of the saw being broken away for lack of space;

Fig. 3 is a vertical front-to-rear section on a plane corresponding to the line 3—3 of Fig. 2, but with the saw omitted and the clamp open; and Fig. 4 is a plan view corresponding to Figs. 1 and 2, only part of the saw being shown.

The device, as here exemplified, comprises a base 1 with an upper shank 2 extending rearwardly, a downwardly extending arm 3, and a lower jaw 4 extending rearwardly under the shank 2, with a clamp-screw 5 threaded up through the jaw 4, so that with the shank 2 resting on top of a table, bench or the like, 6, the screw 5 is tightened against the under side of the object 6, clamping the device firmly thereto. The upper shank 2 is made considerably longer than the jaw 4, to serve for holding the saw-clamp in a bench-vise at a desired angle for more effective operation on the saw held in the clamp. If the bench-vise swivels on its base, practically an unlimited number of positions may be given to the saw-clamp thus held in the vise by its shank 2, which preferably is of rectangular cross-section as shown.

On the front end of the base 1 the rear fixed clamp-plate or saw-engaging member 7 extends equally to right and left and projects above the top of the base, being of segmental shape with the peripheral curve at the top. At opposite ends of this plate 7 are arch-arms 8, extending up from the curved top of the plate 7, curving forwardly, and then extending downwardly and joining the ends of the front fixed clamp-plate 9, which is of the same contour as and co-extensive with the rear plate 7; being spaced forwardly therefrom to admit the parts about to be described. The arch-arms 8 are ribbed to have ample strength to hold the plates 7 and 9 rigidly in their spaced relation; their ribs extending down the rear face of the rear plate 7 and the front face of the front plate 9 with gradually decreasing depth, as shown in Fig. 1. Also, preferably, these arch-arms 8 diverge upwardly about radially to the curves of the tops of the plates 7 and 9; and their upward extent, to their curves, is sufficient to admit a circular saw, as the saw 10, with its teeth 11 well above these tops of the plates. The divergence of the arms 8 leaves ample space between them, above the plates, for access to several teeth of the saw between these arms.

The movable clamp-plate or saw-engaging member 12 is of the contour of the fixed clamp-plates 7 and 9, and coextensive therewith, lying between them. Just inward from the respective arch-arms 8 are forwardly projected bosses 13, near the top of the front plate 9; and cavities 14 are bored in these bosses, extending to within a short distance of the rear side of the plate 9. Retracting springs 15 are contained in the respective cavities 14, coiled around extensions from the movable plate or saw-engaging member 12, in the form of screws 16 which pass back through openings 17 in the rear ends of the cavities 14, through the plate 9, and are tapped into the movable plate 12; the springs 15 being compressed between the heads of these screws 16 and the rear ends of the cavities 14. At the middle of the front fixed plate 9 is a forwardly projected boss 18; and the main clamp-screw 19 is threaded back through this boss 18 and the plate 9, with its rear end against the front side of the movable clamp-plate 12. The thickness of the plate 12 is such as to have ample stiffness to transmit the pressure of the screw 19 from end to end of the clamp; and the width of the space between the fixed plates 7 and 9 is such as to admit this movable plate 12 and the thickest saw to be clamped, and to have some clearance for forward movement of the plate 12, under the action of the retracting springs 15, when the main screw 19 is screwed forwardly, to release the saw of such maximum thickness. Also, the rear plate 7 projects forwardly of the arms 8.

The rod 20 has its upper end fixed in the middle of the bottom of the base 1, just back from the front side of the rear plate 7, and extends down as far as may be desired. The head 21 embraces this rod 20, with a front stud 22, and a boss 23 projecting diagonally rearwardly and having a set-screw 24 threaded into it to clamp against the rod 20 inside the head 21. The front face 25 of this head 21, around the stud 22, is substantially in the vertical plane of the front face of the rear fixed clamping-plate 7 when the head 21 is clamped on the rod so that its stud 22 projects forward at right angles to this plane. This stud 22 is made of diameter less than that of the smallest central opening in a saw to be clamped.

The device being clamped to a bench or the like by its screw 5, or held in a vise or the like, by its shank 2, the movable clamp-plate 12 is positioned forwardly far enough to admit the circular saw to be clamped, simply by screwing the main screw out forwardly. The head 21 is now slid somewhat lower than the position it is to occupy finally, the saw has its central opening 26 slipped onto the stud 22, with the upper edge resting down on top of the stud; and then the head 21 is raised along the rod 20 until the teeth of the saw come slightly above the tops of the plates 7 and 9. Then the main screw 19 is screwed back, clamping the saw firmly between the movable plate 12 and the rear fixed plate 7, as shown in Figs. 1, 2 and 4. The teeth 11 between the arms 8 may now be filed or otherwise operated upon as desired. After all of these teeth easily accessible between the arms 8 have been operated upon as desired, the main screw 19 is loosened, and the saw is turned on the stud 22 until the next lot of teeth are brought between the arms for easy access. This process is repeated until all of the teeth have been operated upon, without the necessity of removing the saw from the clamp, and without disturbing its adjustment up and down in the clamp.

The firmness with which the saw is held, and the ease of reaching new portions of its toothed periphery, enables the work to be done quickly and correctly. The approximate centering of the saw on the stud 22 is sufficient, since very accurate setting of the saw in the clamp, for filing, is unnecessary.

The small stud, admitted to large or small saw openings, and the adjustment of the stud up and down, for saws of different diameter, permits of use of the clamp for saws of widely varying dimensions.

While certain constructional details are deemed preferable in connection with my invention, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. In a device of the character described, a support, front and rear saw-engaging members on said support, adapted to clamp a circular saw, arch elements at opposite ends of the rear saw-engaging member, extending forward across the saw periphery, means supported by said arch elements to support the front saw-engaging member and move it to and from the rear member, means extending down from said support back from the front face of the rear saw-engaging member, and a stud extending forward from this means to enter the central opening of a circular saw slipped freely onto said stud from the front, thereby supporting the saw for clamping the saw, near its periphery, between said saw-engaging members.

2. In a device of the character described, a support, clamping means on the front part of said support, adapted to clamp a circular saw near the saw peripherly, comprising manipulating means at its front, a member extending down from the rear of said clamping means, a stud on said member, extending forward under said clamping means to enter the central opening of a circular saw clamped as aforesaid, and clamping means extending diagonally to the rear of said member, holding said stud for up-and-down adjustment on said member, the diagonal extension of said clamping means making it accessible behind the saw on said stud and in front of an object on which the device is supported at the rear of the device.

3. In a device of the character described, a support, saw-engaging-members on said support, adapted to clamp a circular saw and having edges curved in the direction of the saw periphery, arch elements at opposite ends of one of said members, extending across the saw periphery in planes diverging outward from the center of the saw, and means supported by said arch elements to support the other member and move it to and from said one of said members.

4. In a device of the character described, a support, saw-engaging members on said support, adapted to clamp a circular saw, an arm extending from one of said members, an extension from the other member, entering said arm, a spring engaging said extension and said arm to retract said other member from the one member, and a clamping element operatively mounted in said device to move said other member toward the one member.

HENRY R. BOTHWELL.